Oct. 23, 1934.  H. T. WHEELER  1,978,239
MULTISTAGE IMPACT PACKING
Filed April 21, 1930   2 Sheets-Sheet 1

INVENTOR.
Harley T Wheeler

Oct. 23, 1934.  H. T. WHEELER  1,978,239
MULTISTAGE IMPACT PACKING
Filed April 21, 1930  2 Sheets-Sheet 2
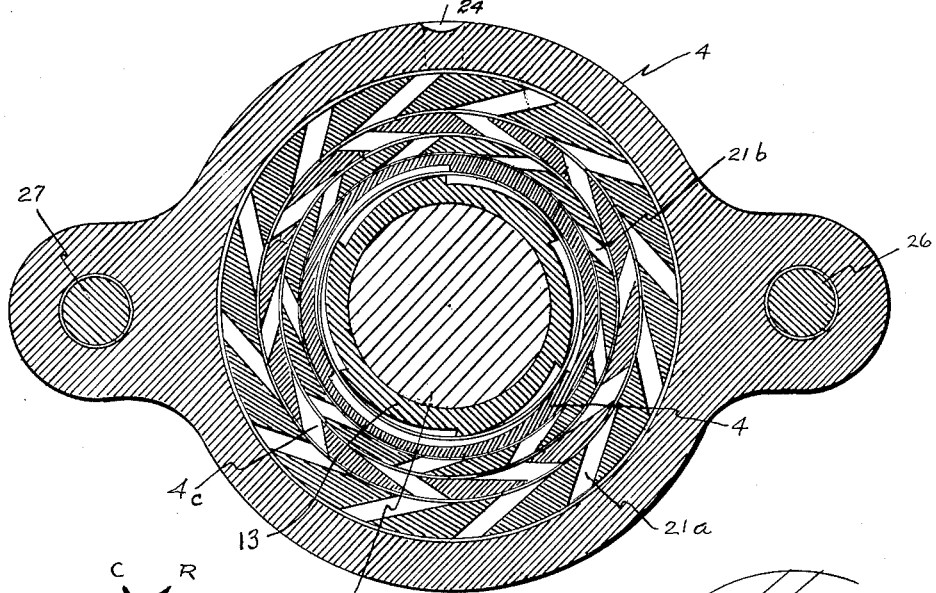
Fig 5
Fig 7
Fig 6
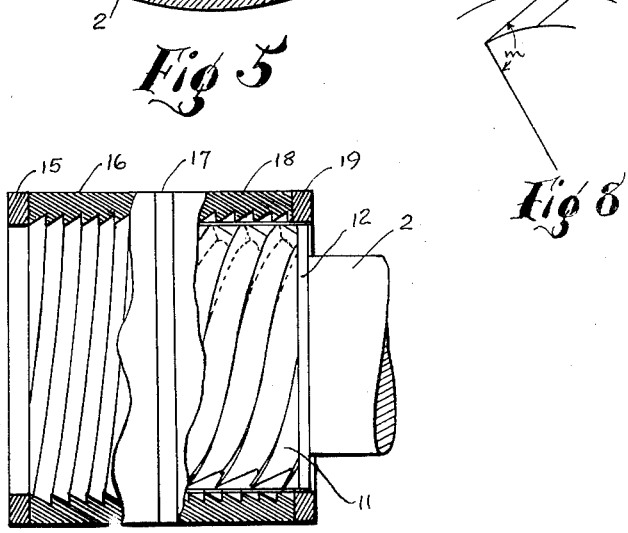
Fig 6
INVENTOR.
Harley T Wheeler Patented Oct. 23, 1934

1,978,239

UNITED STATES PATENT OFFICE 1,978,239

MULTISTAGE IMPACT PACKING

Harley T. Wheeler, Dallas, Tex., assignor to Elizabeth Wheeler, Dallas, Tex.

Application April 21, 1930, Serial No. 445,998

10 Claims. (Cl. 286—10)

This invention relates to a stuffing-box packing and it has particular reference to retaining liquids under exceedingly high pressures, when accompanied by high temperatures on fast moving rotary shafts, and its principal object is to utilize the outward centrifugal force of liquids under rotary motion to overcome the pressure impressed upon the packing.

Another object of this invention resides in its novelty of construction, particularly the right and left hand helical screw compartments which divert the leakage of the packing into restricted paths leading back toward the source of pressure.

Still another and important object is the interlocking annular ring extensions of radial discs having tangential slots which neutralize increase of pressure while the liquid is being transferred to a larger diameter of the packing.

Another object is to return the liquid under restricted volume and decreased pressure from the larger diameter of the packing to a smaller diameter thru properly designed passages to utilize a great reduction in pressure due to the counteraction of centrifugal force.

Yet another and very important object is to inject liquids at the outermost point of the packing to overcome the stability between centrifugal force generated and the impressed pressure on the packing, to thus establish a free circulation toward the source of pressure without changes to operating characteristics.

With these objects and advantages in view, other objects as well as certain features of consruction and arrangement of parts will become apparent as the description proceeds, taken in connection with the accompanying drawings, wherein:

Figure 5 is a cross-section of the interlocking annular extensions of the radial depression rings along line BB of Figure 1.

Figure 6 is a cut-a-way of a complete helical screw compartment.

Figure 7 is an outline exposition of a resolution of forces.

Figure 8 is an outline exposition of depression ring slot angles.

Figure 1:
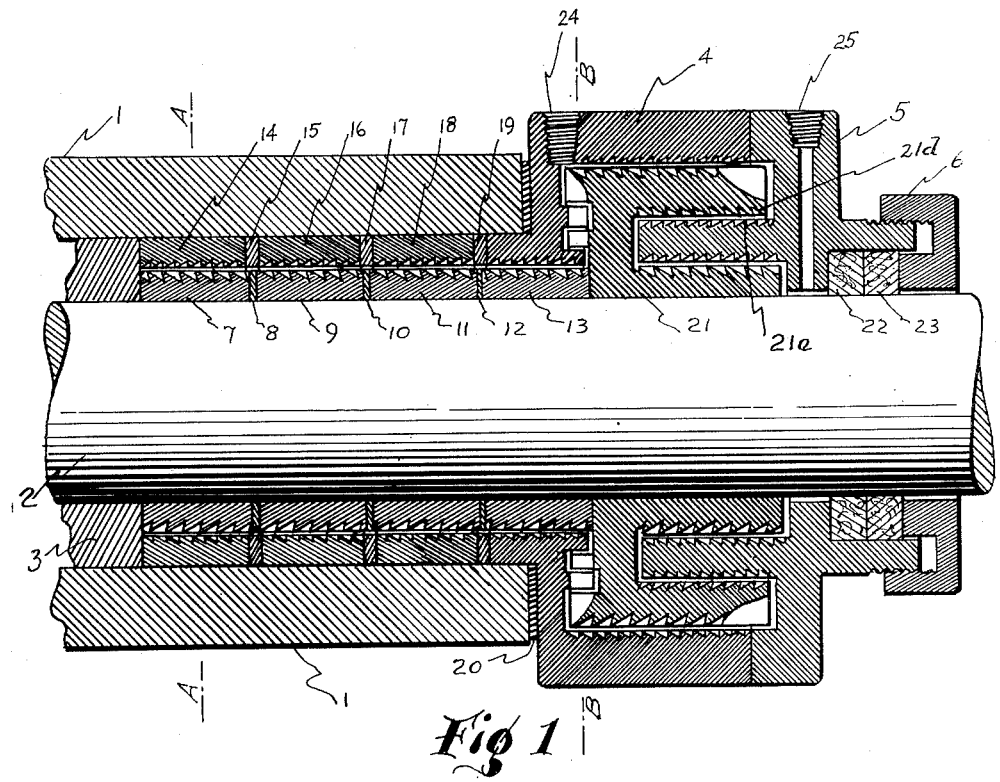
Figure 1 represents a cross-sectional view of a packing constructed according to this invention.

Continuing more in detail it may be observed in Figures 1 and 5 that the packing is made to conform to the usual shape of stuffing-boxes and the methods of attachment to the machine frame, the main housing 4 extending into pump frame 1, the joint being sealed by gasket 20, and the assembly held tight and in place by bolts 26 and 27. As will be apparent the parts may readily be removed for adjusting, repairing and cleaning.

Referring now especially to Figure 1, shaft 2 extends thru from the pumping chamber and is held in alignment by bushing 3. On shaft 2 are assembled helical screw sections 7, 9, 11 and 13, separated by washers 8, 10 and 12. In the stuffing-box helical screw sections 14, 16 and 18 are placed, separated by washers 15, 17 and 19. It may be observed that the assembly of threaded sections is made so that those on the shaft oppose those in the stuffing-box and that the respective washers are opposite each other.

Referring now especially to Figure 5, the main housing 4 is aligned by being extended into the stuffing-box bore and is held against the pump frame by bolts 26 and 27. Runner 21 is pressed onto the shaft 2, the interlocking annular extensions 21a and 21b fitting into the proper grooves cut in the face of main housing 4, while the annular extension 4c fits into the space between annular extensions 21a and 21b. Again referring to Figure 1, housing 5 is attached to the main housing 4 and carries on its outermost part an auxiliary stuffing-box containing rings of soft packing 22 and 23, held in place by gland 6. Opening 24 is used to measure pressure and also to insert gauges to regulate the lateral clearances between the rotating and stationary parts. Opening 25 is a "leak-off," to carry away excess liquid while the pump is being started, and to inject liquids for cleaning purposes, as will afterward be explained.

Figure 2:
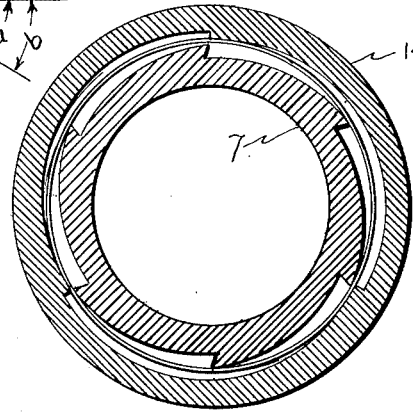
Figure 2 is a cross-section of a complete helical screw compartment on line AA of Figure 1.

The shape of the threads in the rotating and stationary sections is displayed in Figure 2. For the example it is assumed that the pump is rotating in a clockwise direction, looking at Figure 2 as shown and at the end of shaft 2 protruding thru gland 6, of Figure 1. The thread on section 7 is a sextuple left hand. The thread on section 14 is a triple right hand. This relation is displayed to better advantage by Figure 6, a cut-a-way being made to show a perspective of the threads. Section 11 is a sextuple left hand thread, while section 16 is shown as the lower half of a triple right hand thread. The same relationship of right and left hand threads is carried out on the runner 21.

Figure 3:
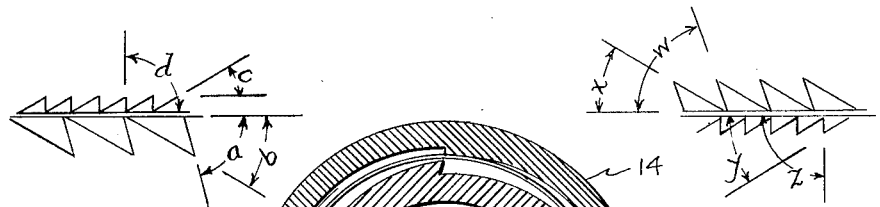
Figure 3 is an outline exposition of the thread angles of an outside rotating element.

Referring now to the shape of the threads, Figure 3 is an outline exposition, or skeleton cross-section of the the helical screws in a compartment as detailed in Figure 1. It may be observed that the threads on the rotating section 7 slant toward the source of pressure. Taking into account the direction of rotation, the threads on rotating sections are made so that they lead back toward the source of pressure, angle $a$ is a measure of the slope of that side of the thread which advances toward the liquid in suspension; angle $b$ is the slope of the other side of the thread. The stationary sections are threaded oppositely in direction to the rotating sections, in this example being right handed. Angle $d$ is a measure of the slope of one side and angle $c$ the slope of the other side of the thread.

Referring again to Figure 1, the angles of the threads on the inside surface of the runner 21, threads 21$d$ and 21$e$, are necessarily different in pitch and slope, as rotary motion forces the liquid against the inner surface of runner 21, bringing about a change in the disposition of centrifugal motion to secure the maximum retarding effect.

Figure 4:
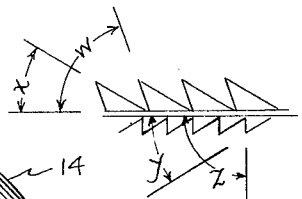
Figure 4 is an outline exposition of the thread angles of an inside rotating element.

Figure 4 is an outline cross-section of threads 21$d$ and 21$e$, detailed in Figure 1. On the rotary runner 21, angle $w$ is a measure of the slope of the thread advancing toward the liquid in suspension and angle $x$ is the slope of the other side of the thread. Similarly, angle $z$ is the slope of the face of the stationary thread facing the source of pressure and angle $y$ is the slope of the other side of the thread.

Referring now especially to Figure 5, the interlocking annular extensions 21$a$ and 21$b$ of the depression ring, or runner 21, are integral parts of runner 21. Each is slotted so that the outer surface of each slot intersects with the inner surface of the depression ring at an angle of about 90 degrees with the radius passing thru the point of intersection, the slots directed toward the direction of rotation. Figure 8 is an outline exposition of the angle $m$ between the radius at the point of intersection with the outer surface of the ring slot.

The stationary depression ring, extension 4$c$, is an integral part of the housing 4. This extension, or annular ring, is slotted so that the outer surface of each slot intersects with the inner surface of the ring at an angle of about 90 degrees with the radius passing thru the point of intersection, but the slots are directly opposite to the direction of those on the runner 21. A practical consideration is that suitable clearances are made between the rotating parts and the stationary elements to allow for misalignment, gravities of liquids, speeds, temperatures and pressures.

This invention is not limited by the features now commonly employed, but is based upon the source of impressed pressure within the machine itself, as will become apparent from the description. This device uses multiple threads on rotating and stationary members. It is not a screw pump, as a screwing action connotes a continuous advancement of a helical surface, at such a speed that the medium being resisted will be pushed before the advancing surface without churning or whipping. This device with multiple threads of an extreme pitch, which strike any particles of the medium a glancing blow is therefore admittedly of an impact type. To use impact efficiently and to secure reverse motion and thereby create a back-pressure, a correct design of the groove must be used.

In this example, the shaft rotates clockwise, the rotating grooves are therefore left-hand. If for further example, the sides of the grooves are radial and the slope of each groove with the shaft centerline is 45 degrees, after impact a particle of medium would be thrown away from the shaft and at right angles to the latter, the angle of incidence being equal to the angle of departure. Then assume the stuffing-box to have a smooth bore, the aforesaid particle would strike the smooth bore with no backward movement. The only back-pressure created would be that of the energy necessary to change the motion of the particle to its original path parallel to the centerline of the shaft which is the direction of leakage. This would be creating friction by whipping the particle against the smooth wall of the stuffing-box, and a back-pressure in proportion.

If backward motion of the particle is to be secured by impact from a clock-wise rotating shaft, it should be apparent that a right-hand thread on the stuffing-box wall would lead the particle back toward the inside, just the same as if a right-hand threaded stud were screwed into the threads of the box wall, because a clockwise motion would be necessary to advance the right-hand threaded stud into the right-hand threads made in the box wall.

The efficiency of this device should now be apparent. Inasmuch as the impact of particles against an advancing angular face, such as the multiple threads mentioned, the particles will be thrown outwardly with the full value of centrifugal force which is proportional to the surface speed which obtains. The energy each particle carries is then expended by the contact with the threads on the box wall, and as the particles under momentum will slow up only after the energy is transformed into heat thru the medium of surface and internal friction, movement will continue in backward direction to absorb the energy. Furthermore, this device will operate with a large clearance around the moving element, the impact being so severe as to throw the particles across the clearance and into the righthand threaded receiving passages without hinderance from vibration and changing position of the shaft. As the particles flow back out of the box wall grooves, they are catapulted back again into the grooves by the action of those on the shaft. Hence if the centrifugal force transferred to the particles is greater than the impressed pressure, the circulation of the leakage outwardly will come to a standstill and heat due to the internal friction of the medium will eventually develop within the passages. This action of throwing the particles backward is distinctive to this invention and in no others has it been possible to use the medium under pressure in the pump chamber to overcome the leakage. It is noted that an external source of the medium is used to affect the sealing force.

Referring now to Figure 3, indicating how the shape of the rotating and stationary grooves can improve the efficiency of transferring energy to the particles. The rotating groove is undercut according to the angle $a$ so that when impact occurs the particle will be dragged backwards slightly before being thrown outwardly. The angle $b$ is made sloping to permit the particles to fly outwardly without striking the succeeding parts of the rotating surface. The angle $c$ is made so that the particles will strike the wall surface in a parallel motion as shown by Figure 7, the resultant direction R being a parallelogram resultant of the direction from the centrifugal force C and that from the leakage L. After sliding into the sloping groove the particles are caught in the trough formed by the angle $d$ perpendicular to the box walls, as shown in Figure 3. As has been stated, every contact by impact in this device forces a backward movement, the momentum of all such movements being efficiently utilized in creating surface friction, the time-lapse of such occurrences and the viscosity of the medium being the cause of creating the desired back-pressure.

Referring now to the action of a centrifugal pump. Rotary motion is utilized in an impeller by means of vanes sloping backwardly from the direction of motion, to transmit energy by impact and push to create movement and pressure of the medium. It is a known fact that if the delivery valves of such a pump are closed, that a churning action results, tho with a smaller consumption of power and a reduced pressure within the casing. That is, power is wasted, heat created in the medium, without moving the medium into or out of the pump.

The reverse of this widely used principle is used in this invention. As in Figure 5, the vanes are turned toward the direction of motion and it is reasonable to believe that the medium will be pulled toward the shaft, instead of thrown outwardly. The vanes of $21a$ and $21b$, revolving in a clock-wise direction are at such an angle that they draw the medium toward the shaft center, as shown by the angle $m$ of Figure 8, while the stationary vanes $4c$ are slanted away from the direction of motion, and it is reasonable to believe that any of the medium guided or pushed into the spaces between the latter, will be directed inwardly. As it takes power to produce pressure by rotating a centrifugal pump, it also takes power to reduce pressure by this method of reversed vanes. The value of the reversal in this device is to permit the medium to finally work outwardly from the shaft center, being so retarded by surface friction that it will arrive at the inner surface of the housing 4, but without any potential energy. To transport the medium to the larger diameter, enough power is necessarily consumed to offset the centrifugal force it might have possessed in passing thru vanes of the opposite positioning. Thus the depression ring of Figure 5, with interlocking tongues of the stationary and revolving vanes is a new and novel method of absorbing centrifugal force by a consumption of power.

The medium passes from the depression impeller to the inner surface of the housing 4, and it is here noted that in nearly all devices to offset pressure by centrifugal force, the medium is moved in a parallel direction to the shaft centerline, but in this device it is now being moved from a larger to a smaller diameter. This, it may be observed is another reversal of a centrifugal pump action. The vanes of Figure 5 transport the medium to a larger diameter, which then becomes the source so far as the succeeding passages are concerned. The medium passes between the grooved sections of the housing 4, the impeller 21 and the cover 5, being paths toward a smaller diameter, during the travel of which, centrifugal force directly resists the inward movement of the medium.

The outer face of the impeller 21 is grooved with a left-hand thread, the inner wall of the housing 4 having right-hand threads to secure the full effect of impact in a backward direction as before explained. The inner surface of the impeller at $21d$ now becomes a retarding element, the grooves being inside and right-handed and having a screw pump action, while the grooves on the stationary tongue at $21e$ are left-hand. There is no impact in this section, the medium being thrown against the grooves on the inner surface of the revolving impeller 21. The medium passes inwardly to the grooves on the shank of the impeller 21, being left-handed, while those on the inner surface of the tongue of the cover 5 are right-handed, impact between the two latter sets of grooves occurring as before explained.

Referring now to Figure 4, the rotating grooves on the inner surface of the impeller 21 are made with an angle $w$ facing the source of the leakage, and the slope angle $x$ gives freedom to the particles after they enter the passage. The stationary grooves at $21e$ are made with an angle $z$ facing the direction of leakage, and are permitted to flow into the trough of each groove by a slope of angle $y$.

The length of a rotating groove has nothing to do with the amount of centrifugal force created at a given diameter and surface speed. Centrifugal force is the mass times the square of the velocity of the particle, divided by the radius at which the particle is considered. A long groove could not increase centrifugal force, but would add a slight amount of surface friction to thus increase back pressure. The relations of the length of a groove to the centrifugal force are recognized, as shown in Figure 1. The centrifugal force created by the grooves 7, 9, 11 and 13 is the same, and if connected together continuously without the partitions 8, 10 and 12, are in series, and would resist no more leakage than section 7 alone. This result is identical with four pieces of pipe connected in series, the drop of pressure being proportional to the surface friction alone.

The impact sections adjacent to the source of liquid will create an end-thrust in the shaft. This is balanced by the opposing grooved sections in the housing 4, the amount of thrust being controlled by the design.

The action of this device is to consistently under all pressures up to its designed capacity, to move leakage backwardly, which provides other valuable features. Liquids under high pressures and temperatures sometimes carbonize or deposit solid matter on the packing surfaces but this may be prevented with this invention by slow injection of cooler media at the point 25. In handling gritty substances, a slight injection of clear liquid at point 25 will maintain enough circulation counter to the direction of leakage to prevent any grit entering the grooved compartments, as the injection would be discharged faster thru the multi-grooved openings than leakage could counteract.

While the pump is idle and being primed for a start, pressure will force considerable liquid thru the packing. This leakage is stopped by the packing rings 22 and 23, and directed into the passage 25. As the speed increases, the centrifugal force will overcome the leakage.

This invention needs no lubrication other than the medium of the pump chamber.

Summarizing, I call attention to the idea of impact incorporated in this invention. Former endeavors to use the screw-pump idea have been based on screw-threads, that is, a continuous adjacent helical groove. Practice shows that above certain peripheral velocities the screw action ceases and churning occurs with excessive heat. To make a coarser pitch also makes a greater depth and the amount of "slip" or backward movement around the threads, increases to overcome any gain due to the pitch increase. To overcome these difficulties I have increased the pitch of the contacting faces without deepening the grooves by using multiple threads. The principle of impact therefore governs the movements of any liquid in the clearance and slipping backward is prevented by the division into sections. The multiple interrupted groove is the only means by which impact may be maintained and is an expression of my improvement.

Manifestly the construction illustrated is capable of considerable variation to meet different pump designs to control conditions of pressure and temperature, and such variations as are within the scope of the appended claims, are considered within the scope of the invention.

I claim:

1. A stuffing-box assembly consisting of a stationary member, a movable member situated within said member with a clearance between them and subjected to a fluid medium under pressure, means to create impact between said fluid medium and said movable member to thereby conduct said medium toward the source of pressure and means to resist the end-thrust due to said impact, an impeller positioned on said movable member having annular extensions, a stationary disc adjacent to said impeller and interfitting with the extensions of said impeller with a clearance between, said fluid between said impeller and disc moving in an outward radial direction due to centrifugal force, helically arranged channels formed in the extensions of said impeller diverting the outward movement of said particles to a direction parallel to said channels and helically arranged, channels formed in the extension of said disc diverting the movement of said particles to a direction parallel to said channels and oppositely that of rotation.

2. In a stuffing-box assembly consisting of a movable member situated within a stationary member with a clearance between and subjected to a fluid medium under pressure, means to create impact between said fluid and said movable member to thereby conduct said fluid toward the source of pressure and means to resist the end-thrust due to said impact, an impeller situated on said movable member adjacent to a stationary disc and means to conduct said fluid medium to the periphery of said impeller with a minimum of added potential energy, a series of adjacent surfaces between said impeller and said stationary member there being a clearance between them leading inwardly toward a smaller diameter, means to create impact between said fluid and said impeller surfaces to thereby conduct said fluid toward the source of pressure and removing said fluid to a relatively smaller diameter.

3. In a stuffing-box enclosing a movable member situated within a stationary member and subjected to a fluid medium under pressure, said members having annular extensions dovetailing into each other with a clearance between to form internal and external surfaces on which a plurality of multiple helical grooves are oppositely generated, impact between said fluid medium and the grooves on the external surfaces of said movable member conducting said fluid toward the source of pressure thereby causing an end-thrust in said movable member, the impact against said grooves on internal portions of said movable member being equal to the impact against said grooves on external portions, thereby neutralizing end-thrusts in said movable member.

4. A stuffing-box assembly, a stationary member, a movable member situated within said stationary member with a clearance between said members and subjected to a fluid medium under pressure, said members having multiple helical grooves oppositely generated thereon, a radially extending portion on each of said members and interfitting projections on said portions.

5. A stuffing-box assembly, a movable member enclosed therein and subjected to a fluid medium under pressure, there being a plurality of multiple helical grooves generated on the periphery of said movable element, and a partition interrupting said grooves.

6. A stuffing-box assembly, a movable member enclosed therein and subjected to a fluid medium under pressure, said movable member having a plurality of multiple helical grooves generated on the periphery thereof, and a series of partitions separating said grooves into a series of sections.

7. A stuffing-box assembly, a stationary member, a movable member situated within said stationary member with a clearance between them and subjected to a fluid medium under pressure, said movable member having a plurality of multiple helical grooves generated thereon and a series of partitions interrupting said grooves, said stationary member also being formed with helical grooves opposed to those on said movable member and partitions interrupting the grooves on said stationary member.

8. A stuffing-box assembly including a movable member, a stationary member enclosing said movable member, with a clearance between and subjected to a fluid medium under pressure, said members having a plurality of multiple helical grooves oppositely generated thereon, and a series of partitions on each member oppositely positioned relative to the opposing member, and with a clearance between interrupting said grooves.

9. A stuffing-box assembly, a stationary member, a movable member situated within said stationary member with a clearance between, an impeller positioned on said movable member and having two annular extensions, a stationary disc adjacent to said impeller and having an annular extension interfitting with the extensions of said impeller with a clearance between, channels formed in the extensions of said impeller in a direction approximately tangential to said movable member and channels oppositely formed in the extension of said stationary disc.

10. A stuffing-box assembly containing a movable member situated within a stationary member with a clearance between and subjected to fluid medium under pressure, said movable member having two spaced sleeve-shaped runners, said stationary member having an annular tongue between said sleeves, a plurality of multiple helical grooves formed on the peripheral opposed faces of said members, said grooves in the stationary member being adapted to receive liquid therein from said rotating member, the centrifugal force of the liquid imparted thereto by the rotating member opposing the circulation of fluid about said members.

HARLEY T. WHEELER.